Sept. 10, 1935.                W. E. WINN                2,013,875
                         WELL SURVEYING APPARATUS
                            Filed Aug. 8, 1930

WITNESS:
Rob R Ritchel

INVENTOR
William E. Winn
BY
Bresser & Harding
ATTORNEYS.

Patented Sept. 10, 1935

2,013,875

UNITED STATES PATENT OFFICE 2,013,875

WELL SURVEYING APPARATUS

William E. Winn, Dallas, Tex., assignor to Sperry-Sun Well Surveying Company, Philadelphia, Pa., a corporation of Delaware Application August 8, 1930, Serial No. 473,889

5 Claims. (Cl. 33—205)

This invention relates to well surveying equipment and particularly to an arrangement for absorbing the shock resulting when a surveying instrument is dropped within a drill stem for the purpose of taking a reading.

In order to avoid interrupting for any extended period of time drilling operations while checking the straightness of a bore hole, it has become general practice to drop a surveying instrument, for example, an acid bottle, inside the drill stem prior to pulling out the stem for the purpose of changing the tools. When this is done the operation of pulling out the drill stem simultaneously serves to draw out the surveying instrument. In the case of an acid bottle, it is, of course, necessary to pull out the drill stem immediately after the reading is made, since subsequent rotation of the drill stem with the acid bottle therein would destroy the record.

The well surveying instrument illustrated in my application Ser. No. 391,723, filed September 11, 1929, is far better adapted for use within the drill stem in the general manner outlined above than the acid bottle, since after the reading is made the recording fluid is drained from the record chamber and consequently further drilling operations may be carried out after the record is made without causing its destruction. My instrument just referred to, however, is quite heavy, being enclosed within a heavy protective casing and consequently even though the drill stem through which it is dropped is full of mud, it falls with considerable velocity and in the absence of shock absorbing means is subject to a very considerable shock upon reaching the bottom of the drill stem. While the instrument is quite rugged in design because of its simplicity, nevertheless repeated shocks of this sort are likely to cause loosening of the siphons contained therein.

It is accordingly the broad object of the present invention to provide means for absorbing the shock when a surveying or similar instrument is dropped within a drill stem. While the invention will be described particularly in connection with the instrument forming the subject-matter of my said prior application, it will be obvious that the shock absorbing arrangement is of general application in connection with both well surveying instruments and other devices which may be dropped within a drill stem.

It is a further object of the present invention to provide a surveying instrument the recording of which is started by the deceleration of the instrument at the bottom of a drill stem.

Further objects of the invention relating primarily to details of construction will be apparent from the following description read in conjunction with the accompanying drawing, in which—

Figure 1:
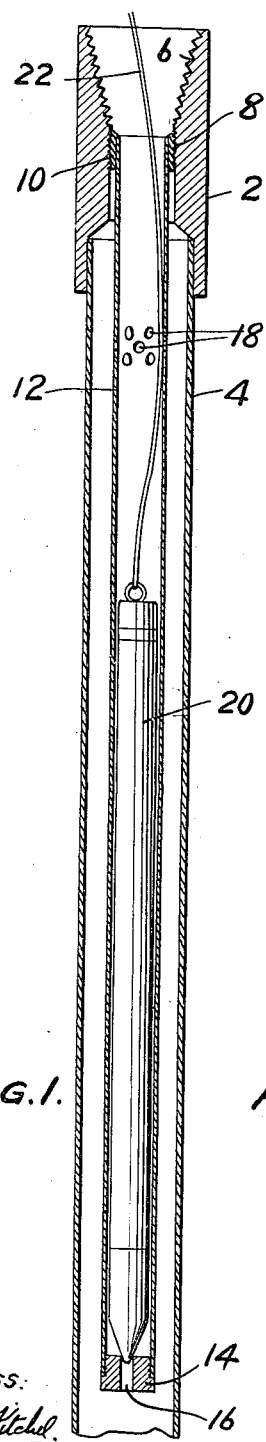
Fig. 1 is an axial section through the improved shock absorbing arrangement and the portion of the drill stem within which it is contained.
Figure 2:
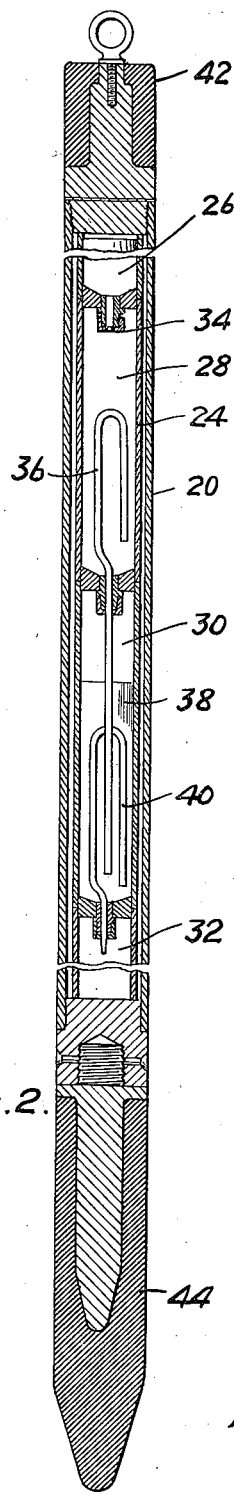
Fig. 2 is an axial section through the well surveying instrument for which the apparatus is particularly designed, this instrument, except for the protective casing, being similar to that illustrated in my prior application.

Referring first to Fig. 1, there is illustrated at 2 a tool joint box which is internally threaded at its lower end to receive the upper end of a section 4 of drill pipe and is also threaded along a taper, as indicated at 6, for connection to an upper coupling member and upper sections of drill pipe. The section 4 in general practice would consist of one of the lowermost sections of the drill pipe near the tool, since it is generally desired to obtain the readings at the lowest point within the bore hole.

The box 2 is also threaded as indicated at 8 to receive a steel bushing 10 having a bevelled entrance and carrying a steel tube 12 which is closed at its lower end by a plug 14 having a relatively small opening 16 extending therethrough. Adjacent its upper end the tube 12 is provided with a number of large holes 18, the group of holes being spaced from the plug 14 a distance greater than the length of the casing 20 of the well surveying instrument. Secured to the top of the casing 20 is a steel line 22 which is of such length that it will project above the box 2 when the instrument rests upon the plug 14 so that the instrument may readily be withdrawn from the tube 12. The tube 12 has an internal diameter just slightly greater than the external diameter of the casing 20 so that a fairly close sliding fit is provided.

The well surveying instrument in its preferred form consists of the outer casing 20 which encloses the instrument proper, designated generally at 24, and consisting of chambers 26, 28, 30 and 32. In the operation of the instrument the chamber 26 is filled with a liquid such as a colored ink. This liquid slowly discharges into the chamber 28 through a restricted nozzle 34. A siphon 36 is arranged to discharge liquid from the chamber 28 into the record chamber 30, in which is located a record member 38. Discharge from the record chamber 30 is effected through a syphon 40, the discharge flowing into the chamber 32. The operation of this device, which is more fully described in my said prior application, effects the production of a mark corresponding to the horizontal liquid surface on the record member 38 from which the slope of the bore hole at the position where the record is made may be readily determined. The syphons 36 and 40 provide a flow of liquid into the record chamber for the production of a record and thereafter the discharge of the liquid therefrom so that even though the drill stem may be rotated or other shocks may be imparted to the system, there will be scarcely any liquid in the record chamber and accordingly the record will not be destroyed.

The casing 20 is provided with rubber-covered top and bottom plugs 42 and 44, respectively.

The operation of the shock absorbing system will be obvious. As the surveying instrument drops within the drill stem, it will attain considerable velocity, although held back somewhat by fluid friction with the mud which is being pumped downwardly inside the drill stem in the usual manner. Prior to the time when the instrument reaches the position of the holes 18, the mud passes freely downwardly through the box into the upper end of the tube 12 and thence out through the holes 18 within the section 4 of drill pipe. The passage through holes 18 being considerably freer than the passage through the smaller opening 16, as soon as the casing 20 passes the position of the holes 18 flow therethrough is substantially cut off and the mud below the instrument must pass through the restricted opening 16 before the instrument may rest upon the plug. The instrument at this time acts substantially as a piston forcing the mud through the restricted opening. Since the larger holes 18 are at this time covered by the instrument, there is an increase of pressure on the mud pump which serves as an indication that the instrument is approaching its proper position for the making of a record. This increased pressure also serves to insure that the instrument passes below the level of the holes 18 and so does not permanently prevent the free flow of mud. Since the flow of mud through the hole 16 is relatively slow, it will be obvious that the instrument reaches the plug 14 and stops at a relatively low velocity without destructive shock.

Figure 3:
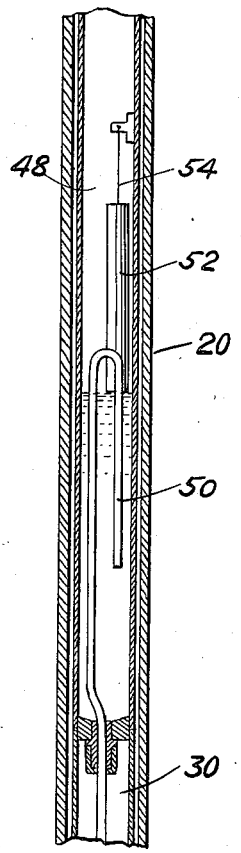
Fig. 3 is an axial section through a portion of a modified form of instrument.

In Fig. 3 there is illustrated a modified form of instrument particularly adapted for operation by being dropped into the drill stem. This instrument is similar to that already described except that chamber 26 is omitted and chamber 28 is replaced by chamber 48 secured to the top of record chamber 30 and provided with a siphon 50, similar to siphon 36, extending into chamber 30. Chamber 48 differs from chamber 28 only in the provision of a large weight 52 suspended from a bracket carried by the chamber wall by an easily breakable cord or thread 54. In the operation of this apparatus the chamber 48 is initially supplied with recording fluid to the level indicated: that is, just below the bend of the siphon and the lower end of the weight 52. When this instrument is dropped within a drill stem, the deceleration, as it reaches the bottom, or, preferably, a shock absorbing chamber of the type illustrated in Fig. 1, if such is provided, causes the cord 54 to break, whereupon the weight 52 drops, displacing the liquid above the bend of the siphon, thus initiating flow into the record chamber. The record is made and the record chamber empties, as in the first described modification.

As stated above, it will be obvious that the shock absorbing arrangement is of utility in connection with other instruments which may be damaged by the shock occurring upon their reaching the lower end of the drill stem.

What I claim and desire to protect by Letters Patent is:

1. In combination with a hollow drill stem adapted to permit the downward passage of a well surveying instrument therethrough, hydraulic shock absorbing means for decelerating the instrument as it approaches the bottom of the drill stem, said means including a tube smaller than the inside diameter of the drill stem having an internal cross-section slightly greater than the external cross-section of the instrument, the bottom of the tube having a restricted opening to prevent the free flow of liquid therefrom, and the upper part of the tube being provided with passage means providing a relatively free flow of liquid therefrom, said passage means being in the side of the tube so as to be closed by the instrument during its passage.

2. In combination with a hollow drill stem adapted to permit the downward passage of a well surveying instrument therethrough, hydraulic shock absorbing means for decelerating the instrument as it approaches the bottom of the drill stem, said means including a tube smaller than the inside diameter of the drill stem having an internal cross-section slightly greater than the external cross-section of the instrument, the bottom of the tube having a restricted opening to prevent the free flow of liquid therefrom, and the upper part of the tube being provided with passage means providing a relatively free flow of liquid therefrom, said passage means being in the side of the tube so as to be closed by the instrument during its passage, and being above the instrument when it rests in its ultimate position in the bottom of the tube.

3. In combination with a hollow drill stem adapted to permit the downward passage of a well surveying instrument therethrough, hydraulic shock absorbing means for decelerating the instrument as it approaches the bottom of the drill stem, said means including a tube having an inside cross-section smaller than that of the drill stem and only slightly greater than the external cross-section of the instrument, the bottom of the tube having a restricted opening to prevent free flow of liquid therefrom, while the upper part of said means is provided with passage means to provide a relatively free flow of liquid from the drill stem.

4. In combination with a hollow drill stem adapted to permit the downward passage of a well surveying instrument therethrough, hydraulic shock absorbing means for decelerating the instrument as it approaches the bottom of the drill stem, said means including a tube axially aligned with the drill stem to receive the instrument and having an inside cross-section smaller than that of the drill stem and only slightly greater than the external cross-section of the instrument, said means being provided with passage means at the upper portion of the tube whereby free flow of liquid from the drill stem is prevented when the instrument is located in the tube in predetermined positions short of its ultimate position but permitted when the instrument attains its ultimate position.

5. In combination with a hollow drill stem adapted to permit the downward passage of a well surveying instrument therethrough, hydraulic shock absorbing means for decelerating the instrument as it approaches the bottom of the drill stem, said means including a tube axially aligned with the drill stem to receive the instrument and having an inside cross-section smaller than that of the drill stem and only slightly greater than the external cross-section of the instrument, the bottom of the tube having a restricted opening to prevent free flow of liquid therefrom, and said means being provided with passage means at the upper portion of the tube whereby free flow of liquid from the drill stem is prevented when the instrument is located in the tube in predetermined positions short of its ultimate position but permitted when the instrument attains its ultimate position.

WILLIAM E. WINN.